United States Patent

Hong et al.

[11] Patent Number: 5,850,969
[45] Date of Patent: Dec. 22, 1998

[54] METHOD FOR CONTROLLING TEMPERATURE IN A REFRIGERATOR WHEN A TEMPERATURE SENSOR OPERATES ABNORMALLY

[75] Inventors: Eui-kyung Hong; Jae-in Kim; Seong-wook Jung, all of Seoul, Rep. of Korea

[73] Assignee: Samsung Electronics Co., Ltd., Suwon, Rep. of Korea

[21] Appl. No.: 916,289

[22] Filed: Aug. 22, 1997

[30] Foreign Application Priority Data

Aug. 23, 1996 [KR] Rep. of Korea .................. 1996-35143

[51] Int. Cl.$^6$ ................................ G01K 3/00; F24F 7/00
[52] U.S. Cl. .......................... 236/49.3; 62/209; 236/78 B; 374/115
[58] Field of Search ................ 236/49.3, 78 B; 62/186, 126, 209; 374/115

[56] References Cited

U.S. PATENT DOCUMENTS 4,122,720 10/1978 Podl ........................................ 374/115
4,355,760 10/1982 Ruby ...................................... 236/78 B
5,407,129 4/1995 Carey et al. ............................ 236/49.3

Primary Examiner—William E. Wayner
Attorney, Agent, or Firm—Burns, Doane, Swecker & Mathis, L.L.P.

[57] ABSTRACT

A method for controlling the temperature of a compartment of a refrigerator, the compartment utilizing at least two spaced apart temperature sensors, such that, even when one of the sensors malfunctions, the compartment is cooled without any degradation of efficiency. The sensors detect respective temperatures in the compartment. While the sensors are operating normally, the detected temperatures are stored. In the event one of the sensors malfunctions, an abnormal average temperature is calculated using: (i) previously stored temperatures of the abnormally operating sensor, and (ii) a temperature recently detected by the normally operating sensor. Thereafter, the calculated abnormal average temperature is compared with a reference temperature to control the operation of a fan.

5 Claims, 3 Drawing Sheets

METHOD FOR CONTROLLING TEMPERATURE IN A REFRIGERATOR WHEN A TEMPERATURE SENSOR OPERATES ABNORMALLY

BACKGROUND OF THE INVENTION

1. Field of the Invention

The present invention relates to a method for controlling temperature in a refrigerator, more specifically, to a method for controlling temperature in a refrigerator which includes at least two sensors for sensing the temperature, such that the refrigerator is capable of operating without any degradation of efficiency even when a sensor operates abnormally.

2. Description of the Related Art

A conventional refrigerator includes a body having a freezer compartment and a refrigerator compartment. The freezer compartment and the refrigerator compartment respectively have fans for supplying cool air. The temperatures in the compartments depend on the cool air supplied by the fans. The cool air is generated when a refrigerant compressed by a compressor is heat-exchanged in an evaporator, and that cool air is conducted into the compartments by a rotation of the fans. In order to maintain the temperatures in the compartments at a suitable level, the fans should be timely operated according to changes in the temperatures in the compartments.

In a large size refrigerator, a damper is disposed to maintain temperature in the refrigerator compartment at a uniform level. The damper regulates the temperature in the refrigerator compartment by guiding the cool air in a wanted direction, or dispersing the cool air to uniformly spread it out. And, at least two temperature sensors are mounted at different places in the refrigerator compartment to sense respective temperatures.

FIG. 1 is a flow chart showing a conventional method for controlling temperature in a refrigerator, and FIG. 2 is a block diagram of a conventional circuit for carrying out the method.

The method begins with sampling temperatures detected by sensors A and B installed in the refrigerator compartment, which is shown as step S1 in the flow chart. Thereafter, at steps S2 and S3, determinations are made as to whether the sensors A and B are operating normally or not. If it is determined that both of the sensors A and B are operating normally, an average of the temperatures sampled at step S1 is calculated at step S4. At step S5, the calculated average temperature is compared with a reference (desired) temperature input by a user. If the average temperature is higher than the reference temperature, the fan of the refrigerator compartment is operated, at step S6. Otherwise, if the average temperature is the same as or below the reference temperature, the fan of the refrigerator compartment is stopped, at step S7.

On the other hand, if it is determined at the steps S2 and S3 that either of the sensors A and B is abnormally operating, the temperature sampled by the other, normally operating, sensor is compared with the reference temperature. In other words, if it is determined the sensor A is abnormally operating at the step S2, a temperature sampled by the sensor B is compared with the reference temperature at step S8. If it is determined the sensor B is abnormally operating at the step S3, a temperature sampled by the sensor A is compared with the reference temperature at step S9. Thereafter, the fan of the refrigerator compartment is operated or stopped according to the result at the steps S6 and S7.

According to the aforementioned conventional method for controlling temperature in a refrigerator compartment, a temperature sampled by an abnormally operating sensor is discarded, and, based on a temperature sampled by a normally operating sensor, the fan of the refrigerator compartment is operated or stopped.

As a result, the conventional method has several problems. If the normally operating sensor is near a warm food or a large food vessel and the other sensor operates abnormally, the temperature sampled by the normally operating sensor will be misproportionate to conditions occurring at the abnormally operating sensor whereby the region surrounding the abnormally operating sensor may be insufficiently or excessively refrigerated.

SUMMARY OF THE INVENTION

It is therefore an object of the present invention to provide a method for controlling a temperature in a refrigerator compartment that utilizes at least two sensors for detecting respective temperatures therein, such that, even when one or all of the sensors abnormally operates, the refrigerator is capable of operating without insufficient or excessive refrigeration occurring around the other normally operating sensors.

According to the present invention, the method for controlling the temperature in the refrigerator compartment includes the steps of: detecting respective temperatures in the refrigerator by means of at least two sensors; determining whether the sensors are operating normally; storing the detected temperatures of sensors operating normally; calculating an average of temperature values associated with all of the sensors, wherein the temperature value associated with an abnormally operating sensor is determined on the basis of temperatures detected thereby and stored prior to the abnormal operation thereof; comparing that average with a reference temperature; and operating a fan of the compartment according to the comparison.

Preferably, the temperature value associated with an abnormally operating sensor is an average of temperatures sensed thereby and stored prior to the abnormal operation thereof.

Preferably, the temperature value associated with a normally operating sensor is a recent temperature detected thereby.

Further features and advantages of this invention will readily be apparent from the specification and the drawings.

DETAILED DESCRIPTION OF A PREFERRED EMBODIMENT

A preferred embodiment of the present invention will be described in detail, referring to the accompanying drawings.

Figure 1:
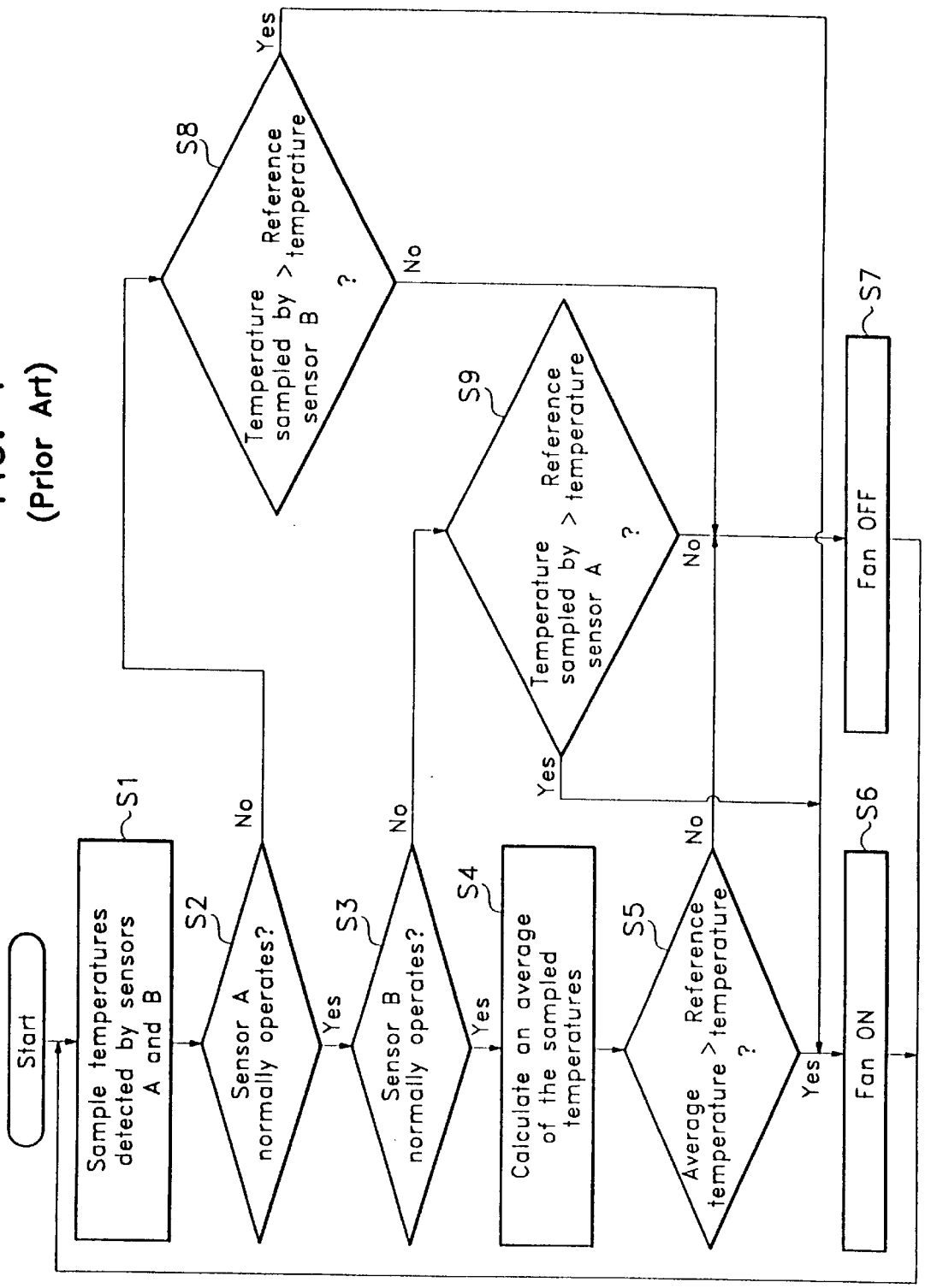
FIG. 1 is a flow chart of a conventional method for controlling temperature in a refrigerator.
Figure 2:
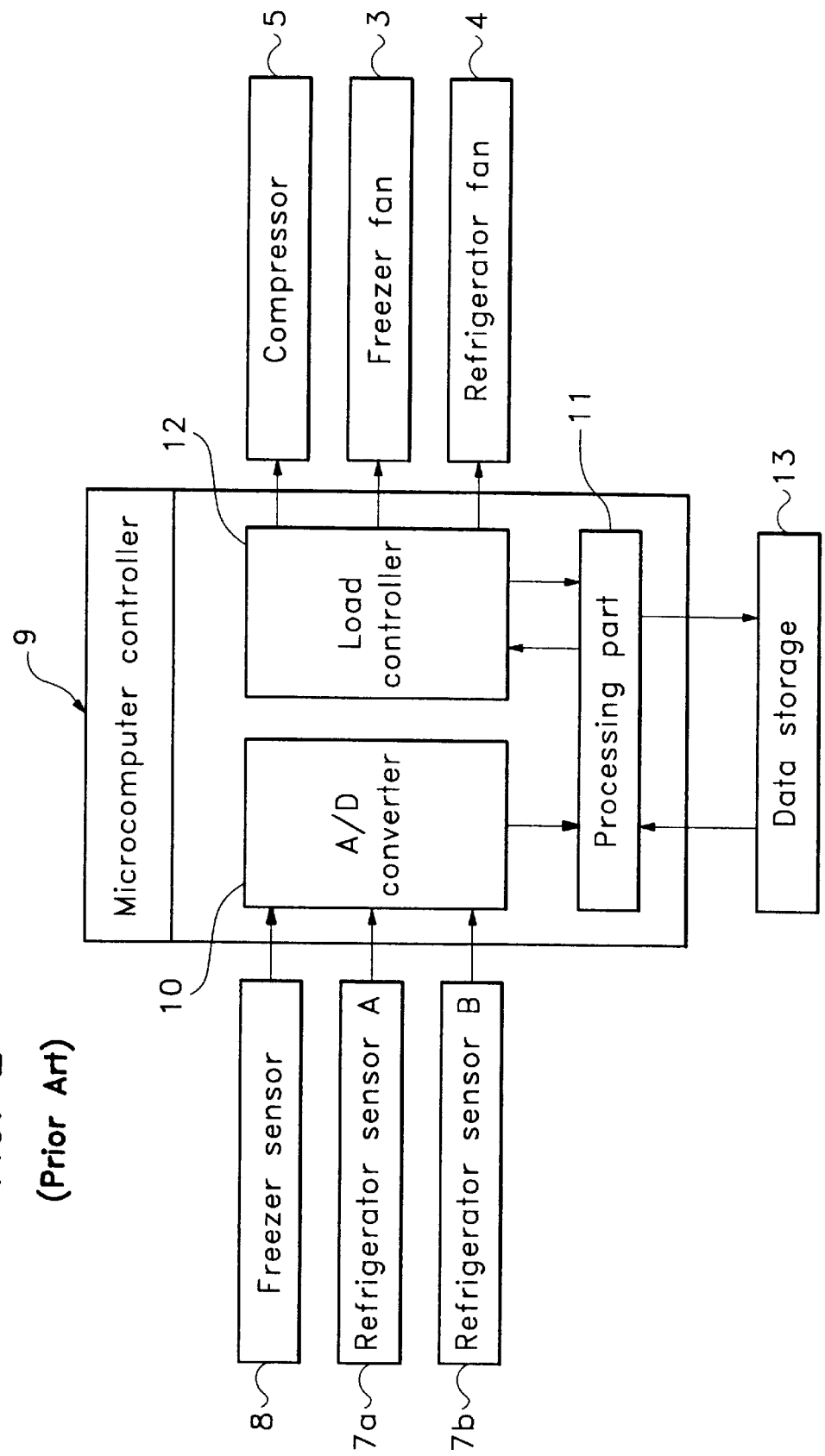
FIG. 2 is a block diagram of a conventional control circuit applied to the conventional method, and which can also be used in conjunction with the present invention.

FIG. 2 shows a conventional control circuit for automatically controlling the operation of a fan 3 in a freezer compartment, a fan 4 in a refrigerator compartment, and a compressor 5, for controlling temperature in the refrigerator. That control circuit can be used in conjunction with the present invention.

A sensor 8 in the freezer compartment and two sensors 7a and 7b in the refrigerator compartment detect respective temperatures in the refrigerator. Signals corresponding to the temperature detections are transmitted to a microcomputer controller 9. The microcomputer controller 9 includes an A/D converter 10, a processing part 11, and a load controller 12. The A/D converter 10 converts analog signals supplied by the sensors 7a, 7b and 8 into digital data. The processing part 11 performs a predetermined program, based on the digital data converted by the A/D converter 10, and the processing part 11 supplies control signals to the load controller 12 according to the detected temperature. Responding to the control signals from the processing part 11, the load controller 12 operates the fans 3 and 4, and the compressor 5. The control circuit further includes a data storage 13 that stores various data processed in the processing part 11. For example, the data storage 13 may be a RAM.

The method for controlling temperature in a refrigerator using the circuit and microcomputer controller 9 shown in FIG. 2, according to the present invention, will be hereinafter described in detail with reference to the flow chart of FIG. 3.

Figure 3:
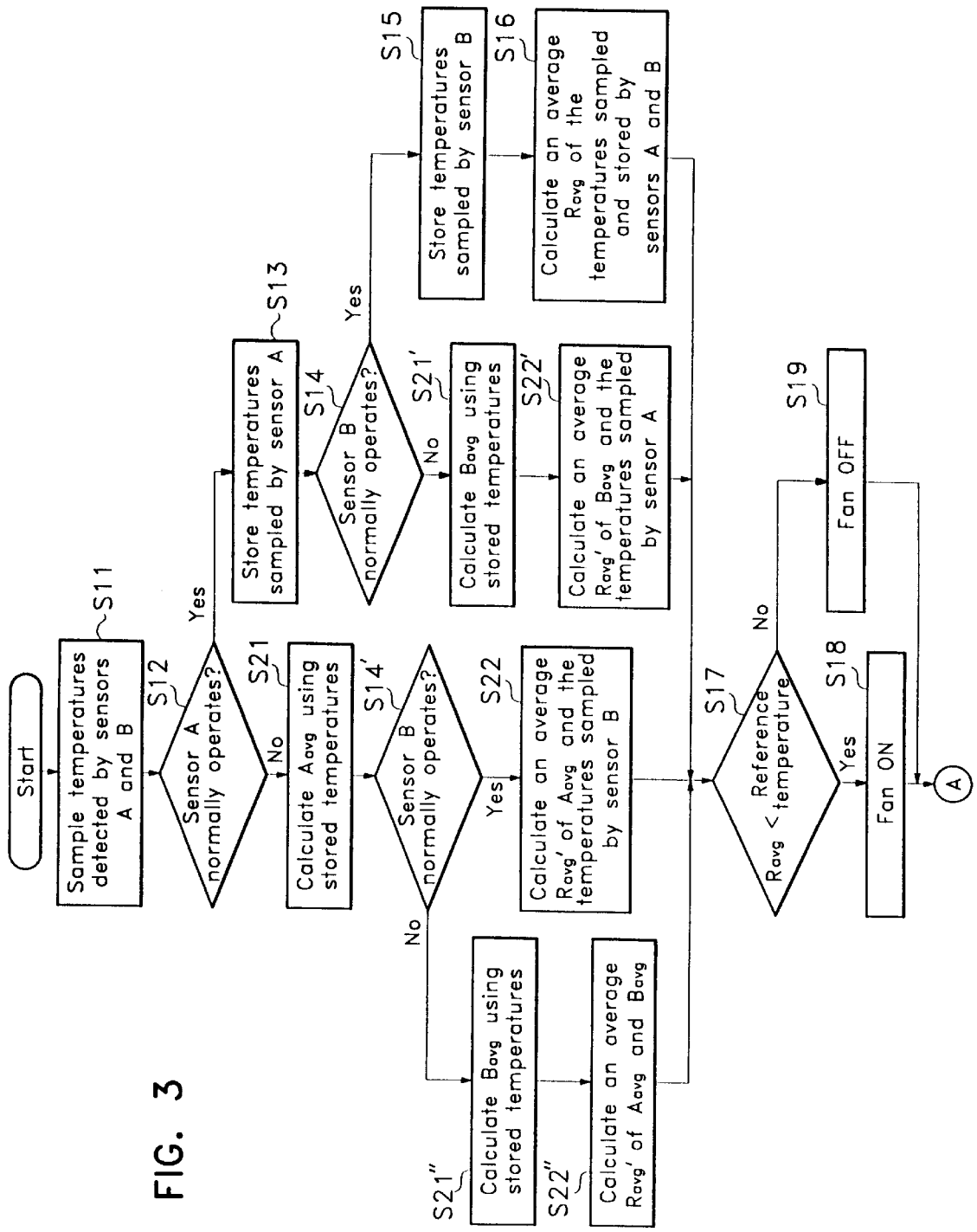
FIG. 3 is a flow chart of a method for controlling temperature in a refrigerator according to the present invention.

Referring to FIG. 3, the method begins with sampling temperatures detected by the sensors A and B (7a and 7b) of the refrigerator compartment, which is shown as step S11 in the flow chart. Thereafter, at step S12, a determination is made as to whether the sensor A (7a) is operating normally or not. If it is determined that the sensor A (7a) is operating normally, a temperature sampled at the step S11 is stored in the data storage 13 of FIG. 2 at step S13. In the same manner, at step S14, it is determined whether the sensor B (7b) is operating normally or not. If it is determined that the sensor B (7b) is operating normally, a temperature sampled at the step S11 is stored in the data storage 13 at step S15.

Temperature values associated with sensors 7a and 7b are then averaged at step S16 to determine an average $R_{avg}$. The "temperature values" depend upon whether the sensors are operating normally or not. Since they are operating normally, the temperature value associated with each sensor is a recently detected temperature. Thus, two recently detected temperatures are averaged to determine $R_{avg}$ when both sensors are operating normally. That average temperature $R_{avg}$ will be referred to as a normal average temperature hereinafter. At step S17, the normal average temperature $R_{avg}$ is compared with a reference temperature adjusted by an operator using a temperature adjustor. If the normal average temperature $R_{avg}$ is higher than the reference temperature, the fan of the refrigerator compartment is commanded to operate at step S18. Otherwise, if the normal average temperature $R_{avg}$ is lower than the reference temperature, the fan of the refrigerator compartment is commanded to stop at step S19.

On the other hand, if it is determined that the sensor A (7a) is abnormally operating and the sensor B (7b) is normally operating, then the "temperature value" associated with the abnormally operating sensor 7a is not a recently detected temperature. Rather, temperatures previously detected by sensor 7a and not stored in the data storage 13 when the sensor A (7a) was operating normally are averaged at step S21. That average temperature $A_{avg}$ will be referred to as a stored average temperature hereinafter and constitutes the temperature value associated with sensor 7b that is to be utilized in calculating an average of both sensors. That is, an average $R_{avg}'$ of: (i) the stored average temperature $A_{avg}$, and (ii) a recent temperature detected and sampled by the normally operating sensor B (7b), is calculated at step S22. The average temperature $R_{avg}'$ calculated at step S22 will be referred to as an abnormal average temperature hereinafter. The abnormal average temperature $R_{avg}'$ is then compared with the reference temperature at step S17. When the abnormal average temperature $R_{avg}'$ is higher than the reference temperature, the fan of the refrigerator compartment is commanded to operate at step S18. If the abnormal average temperature $R_{avg}'$ is lower than the reference temperature, the fan of the refrigerator compartment is commanded to stop at step S19.

On the other hand, if it is determined that the sensor A (7a) is normally operating and the sensor B (7b) is abnormally operating, temperatures previously detected and stored in the data storage 13 when the sensor B (7b) was normally operating are averaged at step S21'. That average temperature $B_{avg}$ will be referred to as a stored average temperature hereinafter. That average temperature $B_{avg}$ is used as the temperature value from sensor 7a in calculating the average from both sensors 7a, 7b. Thereafter, an average $R_{avg}'$ of the temperature detected and sampled by the normally operating sensor A (7a) and the stored average temperature $B_{avg}$, is calculated at step S22'. The average temperature $R_{avg}'$ calculated at the step S22' will be referred to as an abnormal average temperature hereinafter. The abnormal average temperature $R_{avg}'$ is then compared with the reference temperature at step S17. When the abnormal average temperature $R_{avg}'$ is higher than the reference temperature, the fan of the refrigerator compartment is commanded to operate at step S18. Otherwise, when the abnormal average temperature $R_{avg}'$ is lower than the reference temperature, the fan of the refrigerator compartment is commanded to stop at step S19.

If it is determined that both of the sensors A and B (7a and 7b) are abnormally operating at steps S12 and S14', temperatures previously detected and stored in the storage 13 when the sensors A and B (7a and 7b) were normally operating are averaged at steps S21 and S21" to determine respective stored average temperatures $A_{avg}$ and $B_{avg}$. Thereafter, an abnormal average $R_{avg}'$ of the stored average temperatures $A_{avg}$ and $B_{avg}$, is calculated at step S22". The abnormal average temperature $R_{avg}'$ is then compared with the reference temperature at step S17. When the abnormal average temperature $R_{avg}'$ is higher than the reference temperature, the fan of the refrigerator compartment is commanded to operate at step S18. Otherwise, when the abnormal average temperature $R_{avg}'$ is lower than the reference temperature, the fan of the refrigerator compartment is commanded to stop at step S19.

Since a rapid change in temperature in a refrigerator rarely occurs, the same efficiency can be obtained by operating or stopping the fans according to an average of temperatures detected and stored before any of at least two sensors installed in the refrigerator abnormally operates.

As aforementioned, in the event that any of at least two temperature sensors in a refrigerator compartment operates abnormally, the method for controlling temperature in the refrigerator according to the present invention is capable of an emergency operation that provides results almost the same as during normal operation, and therefore is capable of preventing insufficient refrigeration or a partially excessive refrigeration. This results in a highly efficient refrigerator.

The present invention is not restricted to the aforementioned preferred embodiment, and it is clearly understood that many variations may be made within the scope and spirit of the present invention by anyone skilled in the art. For example, the refrigerator may include more than two sensors. When more than two sensors are used in the refrigerator, the method is applied to the respective sensors in the same manner without any degradation of efficiency. Additionally, it is also evident that the present invention may applied to the freezer compartment as well as the refrigerator compartment.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. A method for controlling a temperature in a compartment of a refrigerator, which compartment includes at least two sensors for sensing respective temperatures therein; the method comprising the steps of:

A) detecting respective temperatures in the compartment by means of said sensors;

B) determining whether said sensors are operating normally;

C) storing said detected temperatures of sensors operating normally;

D) calculating an average of temperature values associated with all of said sensors, wherein the temperature value associated with an abnormally operating one of said sensors is determined on the basis of temperatures detected thereby and stored prior to an abnormal operation thereof;

E) comparing the average calculated in step D with a reference temperature; and

F) operating a fan of said compartment according to the comparison in step E.

2. The method according to claim 1 wherein at step D the temperature value associated with an abnormally operating sensor is an average of temperatures detected thereby and stored prior to the abnormal operation thereof.

3. The method according to claim 2 wherein at step D, the temperature value associated with a normally operating sensor is a recent temperature detected thereby.

4. The method according to claim 1 wherein at step D, the temperature value associated with a normally operating sensor is a recent temperature detected thereby.

5. The method according to claim 1, wherein, at step F, said fan is operated when said average is higher than said reference temperature, and said fan is stopped when said average is lower than said reference temperature.

* * * * *